Figure 1:
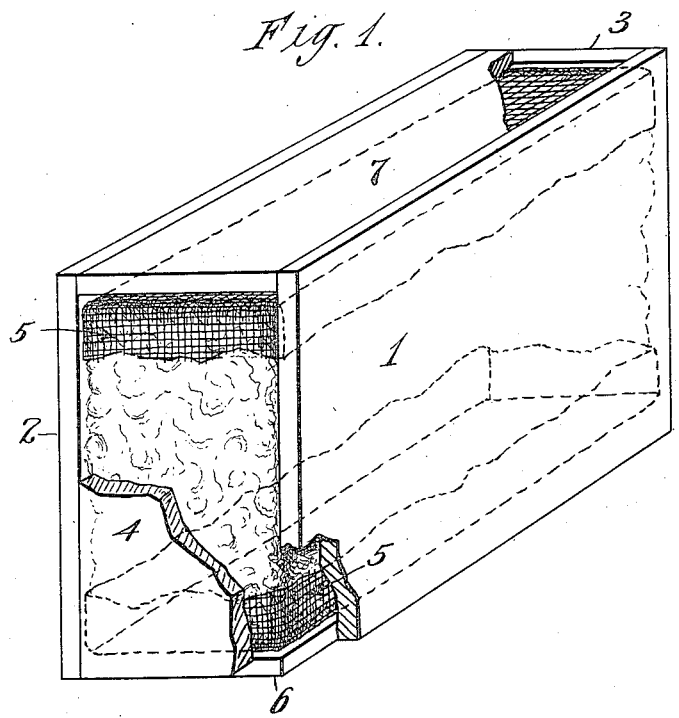

W. D. NESBITT.
COMPRESS BALE AND METHOD OF COMPRESSING.
APPLICATION FILED SEPT. 29, 1916.

1,256,505.

Patented Feb. 12, 1918.

Inventor.
William D. Nesbitt
by his Atty's:
Philipp Sawyer Rice & Kennedy

UNITED STATES PATENT OFFICE.

WILLIAM D. NESBITT, OF BIRMINGHAM, ALABAMA, ASSIGNOR TO STANDARD COMPRESS AND WAREHOUSE CORPORATION, OF NEW YORK, N. Y., A CORPORATION OF VIRGINIA.

COMPRESS-BALE AND METHOD OF COMPRESSING.

1,256,505.   Specification of Letters Patent.   Patented Feb. 12, 1918.

Application filed September 29, 1916. Serial No. 122,812.

*To all whom it may concern:*

Be it known that I, WILLIAM D. NESBITT, a citizen of the United States, residing at Birmingham, county of Jefferson, and State of Alabama, have invented certain new and useful Improvements in Compress-Bales and Methods of Compressing, fully described and represented in the following specification and the accompanying drawings, forming a part of the same.

This invention relates to improvements in the method of compressing baled materials, particularly cotton, and to an improved compressed bale.

As is well-known, cotton is baled at the plantation or gin, this being accomplished by the use of the ordinary plantation baling press, this press turning out a bale partly enveloped in bagging and banded. Relatively speaking, the plantation presses are low powered, with the result that the bales they turn out are too bulky for economical shipment, particularly for export shipment. Bales intended for export, as well as some of the bales for domestic shipment, have, therefore, been for many years subjected to the action of very powerful presses, known as "compresses", which are located at central shipping points. High density of the cotton in the bale was considered of prime importance, the theory being that economy of loading space could be secured by very high density bales, and these compresses were, therefore, so constructed as to subject the bale to very heavy pressures, with the idea of securing this very high density. In fact, these compresses have been built to produce pressures of one hundred and sixty and two hundred tons per square foot of pressure surface. Plantation bales vary very considerably in size and weight, but these facts were not taken into consideration in the operation of the compresses, each bale being subjected to the full amount of pressure which the compress was capable of effecting irrespective of the amount or weight of cotton in the bale. The result has been that, in many instances, the cotton has been matted, felted or cut so that such economy of loading space as has been secured by these high density bales has been offset to a degree, at least, by injury to the cotton.

Further, the compresses which have been practically operated consist of a pair of platens or pressure heads between which the bale was smashed vertically. The smashing operation produced bales which were very irregular in configuration and in which the cotton was liable to be unevenly compressed, the pressure being more effective to compress the cotton at the center of the bale than at the sides and ends, because the cotton could spread to a certain extent at the sides and ends. The banding was, of course, done while the bale was under the compressing pressure, but the bales when released from the pressure could mushroom at the ends, there being no bands at the ends to hold it. The cotton at the ends of the bale was, therefore, in a loose and fluffy condition and to a lesser extent at the sides of the bale, it being understood that as a rule the bagging is not large enough to completely cover the sides of the bale. The exposed cotton being in a loose or fluffy condition, readily absorbed moisture from damp atmospheres, and, further, this loose, fluffy condition rendered it readily ignitible by sparks so that the fire hazard in handling such bales was a matter of great commercial importance.

Commercially speaking, therefore, the method of compressing cotton which has been generally employed produced bales highly irregular in conformation, and bales in which the cotton, particularly at the ends, was in such condition as to render the bales liable to a heavy fire hazard. Further, the fiber was frequently injured by the heavy pressures employed, and though the bales were of high density, they have not shown the economy of loading which was expected, the great irregularities in the conformation of the bales rendering them difficult to economically stow. High density of bales has not, therefore, resulted in high density of loading.

Although the compresses in practical operation have been constructed to produce the exceedingly heavy pressures referred to, it has been suggested that these pressures be still further increased by a construction of compress which would narrow the bale and prevent sidewise spreading under pressure. A construction of compress intended to carry out this suggestion has been used to a limited extent but has not proved satisfactory in practice for the reason that it resulted in damage to the fiber, and the resultant bales had many of the disadvantages of the compress bales before referred to.

The present invention has for its object to improve the procedure of compressing plantation or gin cotton bales in order to produce compressed bales of cotton which will give high density of loading in shipment, although the compressing involves much lower pressures than with the so-called high density compresses heretofore employed.

The invention further has for its object an improvement in the procedure of compressing cotton resulting in the production of compressed bales which are to a considerable extent damp proof on their exposed surfaces and in which the liability to fire is greatly reduced.

The invention further has for its object the production of an improved compressed cotton bale.

The accompanying drawings diagrammatically illustrate an apparatus and bale which will assist in making the invention clear to those skilled in the art.

Figure 1 diagrammatically represents a compress chamber, certain parts being broken away to show the plantation bale in the chamber, the parts being shown in the position they occupy just prior to the compressing operation.

Figure 2:
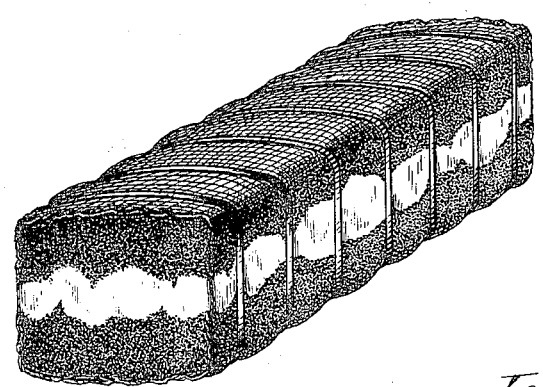

Fig. 2 illustrates a compressed bale in perspective, it being understood that this illustration is diagrammatic merely and intended to show generally the typical features of bales compressed in accordance with the invention.

As has been pointed out, the bale when it leaves the plantation or gin baling press has, what may be arbitrarily termed its top and bottom covered with sheets of bagging, the bagging overlapping but usually not covering the sides and ends of the bale. In carrying the invention into effect, the plantation bale is placed in the compress, the ties or bands being removed so that the bale expands very considerably. Before the compressing action, properly speaking, is begun, the bale is dimensioned in two directions, that is, its length and breadth are determined, these terms being arbitrarily selected to indicate two dimensions of the bale. In the practical carrying out of the invention, this dimensioning will be effected by providing the compress chamber with movable sides and ends which can be located so as to determine the two dimensions referred to of the bale. In the drawings, 1 and 2 represent the movable sides of a compress chamber and 3 and 4 represent its movable ends, the parts 1 and 4 being broken away. In a practical compress, suitable mechanical devices (not shown) will, of course, be provided for moving these parts.

In the prior art of compressing, the bagging at the ends of the bales was loose during the compressing operation and in the reduced bale this bagging had to be folded in or sewed. In carrying the present invention into effect, however, according to its best embodiment, the bagging is arranged to overlap the ends of the bale, as indicated at 5 in the drawings. After the bagging has been thus arranged, the cotton in the compress chamber is subjected to pressure, this being done by moving up one of the remaining walls of the compress chamber. In the drawings, the bottom wall 6 is indicated as movable, the top wall remaining stationary and forming a pressure abutment. As a result of this the bagging at the ends is forced into the cotton, as more fully explained hereinafter.

In carrying out the invention, the pressure brought to bear to effect the compressing operation is a predetermined pressure, that is, it is so controlled that it never exceeds more than a predetermined amount per square foot of pressure surface irrespective of the amount or weight of cotton in the bale in the compress chamber, the compressing operation being stopped when this predetermined pressure limit is reached. Further, the pressure employed is considerably lower than the pressure employed in the compresses heretofore commercially used. Practically, the pressure employed in carrying the invention into effect is from about fifty to sixty tons per square foot of pressure surface. The result of this compressing operation is that the compressed bales are all practically of substantially the same length and width. The thickness of the bales will, however, vary according to the amount of cotton in the compress chamber, because the limit of pressure will be reached and the compressing operation will be interrupted earlier in the travel of the compressing wall of the chamber when there is a large bale in the chamber than it will be when there is a small bale in the chamber. It follows that the bales produced by the compressing operation will be uniform in length and breadth but will vary in thickness. Further there will be no undue spreading of the cotton in the bale so that the bale will be of comparatively even density throughout.

When the invention is practised in accordance with its best embodiment, the side and end walls of the compression chamber will be smooth. When the steps referred to are thus carried out in a compression chamber having smooth side and end walls, it will be found, when the compressing operation is completed, that the exposed cotton at the sides and ends of the bale, that is, the surfaces not covered by the bagging, have a sort of nap, that is, the fibers seem to lie in one direction, so that they present a smooth surface to the touch when the hand is drawn over the surface in one direction, but the fibers have a roughness when smoothed in the opposite direction. These exposed surfaces are, further, comparatively hard and smooth and present the general appearance of a thin veneer. In other words, these exposed surfaces may be said to be planished or calendered, this being due to the combined action of the compression and the smooth walls, and also, apparently, to a very slight exudation of the oil which the cotton fiber contains. These planished or calendered surfaces present no loose tufts of cotton which can catch and be ignited by sparks, and, further, the calendering, planishing or veneering affords a surface which protects the cotton from dampness, as these surfaces do not readily absorb moisture from damp atmospheres. The bales are, therefore, to a considerable extent, damp proof as to their exposed surfaces and the fire hazard is greatly reduced.

It has been pointed out that in carrying the invention into effect in accordance with its best embodiment, the compressing operation is interrupted when a predetermined pressure per square foot of surface has been reached, irrespective of the amount or weight of cotton in the bale chamber, and it has been stated that the result of this interruption of the compressing operation, taken in connection with the dimensioning of the bales referred to, is to produce bales which are substantially identical in length and width but vary in thickness. A further result of the compressing operation, when carried out in accordance with the invention, is the production of bales which more nearly approach a true rectangular configuration than the compressed bales heretofore used, there being comparatively little or no mushrooming of the cotton at the ends of the bales. Such bales afford very material advantages in the way of stowing for shipment. As the ends are not mushroomed the bales can be set more closely, and, further, in the run of bales a selection is afforded from varying sizes so that spaces which would otherwise be unoccupied, can be filled by a properly selected bale or bales. The result is that although bales compressed in accordance with the invention have less density of bale during the compression operation than the compressed bales heretofore made, a much higher density of loading can be secured than with the former so-called high density bales. This lower density of bale during compression has the further advantageous result that the fiber is not matted or felted during the compressing operation so as to injure it.

It has also been pointed out that in carrying out the invention in accordance with its best embodiment, the bagging at the ends and sides of the bale, instead of being held away during the compressing operation, is arranged so as to overlap the cotton in its uncompressed condition. The result of this is that as the compressing proceeds, the bagging is forced or embedded into the cotton so that in the compressed bale the bagging is, practically speaking, integral with the cotton. It is unnecessary, therefore, to sew the ends of the bagging together, as has been the practice in former compressing methods. By making it unnecessary to thus sew the ends of the bagging together, considerable time and labor is saved.

It has also been pointed out that prior to the beginning of the compressing operation, properly speaking, the bales are dimensioned in two directions, the compressing pressure being interrupted when a predetermined pressure per square foot of surface has been attained. While the invention in its broader aspects is not to be limited to specific dimensions of bales, it has been found that, under present conditions of shipment, the most advantageous results can be secured from bales in which the two dimensions referred to are fifty-two and twenty-four inches respectively. It has further been found, as has been indicated, that a pressure of about fifty tons per square foot of pressure is the most advantageous pressure to use. Under present plantation or gin bale conditions, it has been found that the interruption of the pressure at about fifty tons per square foot of surface will result in the production of bales which vary in their third dimension—the two dimensions being fifty-two and twenty-four inches as above stated—from sixteen to twenty-two inches, according to the weight of cotton in the bale.

While the invention has been particularly described with reference to the compressing of cotton, it is to be understood that it is not limited in all its aspects to that material only, since it is equally important in connection with other fibrous materials which it is customary to bale loosely and then compress, as, for instance, hemp and sisal.

What is claimed is:

1. The method of compressing plantation or gin bales which consists in dimensioning successive bales to determine the dimensions of the compressed bales in two directions and then subjecting the bales to a predetermined compressing pressure per square foot of pressure surface, whereby successive bales are produced which are substantially identical in length and breadth, the third dimension varying according to the amount or weight of material in the bale.

2. The method of compressing plantation or gin bales which consists in dimensioning successive bales to determine the dimensions of the compressed bales in two directions and then subjecting the bales to a predetermined and relatively low compressing pressure per square foot of pressure surface, whereby successive bales are produced which are substantially identical in length and breadth, the third dimension varying according to the amount or weight of material in the bale, the density of the material being substantially identical in successive bales.

3. The method of compressing plantation or gin bales which consists in dimensioning successive bales to determine the dimensions of the compressed bales in two directions and then subjecting the bales to a predetermined compressing pressure of approximately fifty to sixty tons per square foot of pressure surface, whereby successive bales are produced which are substantially identical in length and breadth, the third dimension varying according to the amount or weight of material in the bale.

4. The method of compressing plantation or gin cotton bales which consists in arranging the bagging prior to the compression of the cotton in the compress chamber so that it overlaps the sides and ends of the bales, and then compressing to embed the bagging in the compressed cotton.

5. The method of compressing plantation or gin cotton bales which consists in subjecting the cotton on the surface of the bale not covered by the bagging to a planishing or calendering action during the compression, such action producing a surface which is free from loose tufts.

6. The method of compressing plantation or gin cotton bales which consists in placing the bale in a compression chamber having smooth side and end walls, arranging the bagging so as to overlap the ends of the bale, dimensioning the bale to determine its dimensions in two directions, and then subjecting the bale to a final compressing pressure, whereby a bale is produced which has the exposed cotton planished or calendered and the bagging embedded in the sides and ends of the bale.

7. The method of compressing plantation or gin bales of cotton which consists in predetermining the dimensions so that the compressed bale will have a dimension in one direction of fifty-two inches and in another direction of twenty-four inches, and then subjecting the bales to from about fifty to sixty tons pressure per square foot of pressure surface, whereby bales are produced which will vary in thickness from sixteen to twenty-two inches according to the weight of cotton in the bale.

8. The method of compressing plantation or gin cotton bales which consists in predetermining the size of each bale as to two of its dimensions, and so compressing and banding that the sides and ends of the bale will be contained in substantially plane surfaces, and the sides not covered by the bagging free from tufts.

9. A bale of compressed cotton having the surface not covered by bagging planished or calendered and free from tufts.

10. A bale of compressed cotton having the top and bottom covered by bagging, the overlapped ends of the bagging being secured by being embedded in the surface of the bale.

11. A bale of compressed cotton having the top and bottom covered by bagging, the overlapping ends of the bagging being secured by being embedded in the surface of the bale and the surface not covered by the bagging being planished or calendered.

12. A bale of compressed cotton having its top and bottom surfaces covered by bagging, the sides and ends of the bale being contained in substantially plane surfaces relative to the surfaces covered by the bagging.

In testimony whereof, I have hereunto set my hand in the presence of two subscribing witnesses.

WILLIAM D. NESBITT.

Witnesses:
NANNIE C. DENSLER,
M. C. HAWKINS.